US010884939B2

(12) United States Patent
Polychroniou et al.

(10) Patent No.: US 10,884,939 B2
(45) Date of Patent: Jan. 5, 2021

(54) CACHE PRE-FETCHING USING CYCLIC BUFFER

(71) Applicant: Amazon Technologies, Inc., Seattle, WA (US)

(72) Inventors: Orestis Polychroniou, San Francisco, CA (US); Naresh Kishin Chainani, Mountain View, CA (US); Ippokratis Pandis, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 16/016,216

(22) Filed: Jun. 22, 2018

(65) Prior Publication Data

US 2019/0377683 A1    Dec. 12, 2019

(30) Foreign Application Priority Data

Jun. 11, 2018 (GR) ............................... 20180100255

(51) Int. Cl.
*G06F 12/121* (2016.01)
*G06F 12/0891* (2016.01)
*G06F 12/0862* (2016.01)

(52) U.S. Cl.
CPC ...... *G06F 12/0891* (2013.01); *G06F 12/0862* (2013.01); *G06F 12/121* (2013.01); *G06F 2212/1044* (2013.01); *G06F 2212/602* (2013.01)

(58) Field of Classification Search
None
See application file for complete search history.

(56) References Cited

U.S. PATENT DOCUMENTS

| | | | |
|---|---|---|---|
| 6,539,467 B1 * | 3/2003 | Anderson | G06F 9/30014 711/149 |
| 2015/0149714 A1 * | 5/2015 | Pugsley | G06F 12/0862 711/105 |
| 2017/0371589 A1 * | 12/2017 | Keeler | G06F 3/0659 |

OTHER PUBLICATIONS

Solution Hacker, "Amazon Redshift in Practice," 2017, <http://solutionhacker.com/amazon-redshift-practice/> [retrieved May 8, 2018], 12 pages.
Ian Meyers et al., "Building Your Data Warehouse with Amazon Redshift," © 2015 Amazon Web Services, Inc., 44 pages.
Wikipedia, "Circular Buffer," pages last edited on Feb. 3, 2018, <https://en.wikipedia.org/wiki/Circular_buffers> [retrieved Apr. 19, 2018], 4 pages.
Menon et al., "Relaxed Operator Fusion for In-Memory Databases: Making Compilation, Vectorization, and Prefetching Work Together At Last," 2017, Carnegie Mellon University, 13 pages.
Thomas Neumann, "Efficiently Compiling Efficient Query Plans for Modern Hardware," 2011, Technische Universität München, 12 pages.

(Continued)

*Primary Examiner* — Brian R Peugh
(74) *Attorney, Agent, or Firm* — Davis Wright Tremaine LLP

(57) ABSTRACT

A computer system comprises memory to store computer-executable instructions. The computer system may, as a result of execution of the instructions by one or more processors, cause the system to load a first subset of a set of data elements into a first cache, load a second subset of the set of data elements into a second cache, and as a result of elements of the first subset being processed, issue commands to place elements of the second subset into the first cache to enable processing the second subset to be processed from the first cache.

20 Claims, 5 Drawing Sheets

(56) References Cited

OTHER PUBLICATIONS

Wikipedia, "Static Random-Access Memory," pages last edited on Jan. 29, 2018, <https://en.wikipedia.org/wiki/Static_random-access_memory> [retrieved May 9, 2018], 6 pages.
Patterson et al., "Computer Organization and Design: The Hardware/Software Interface," 2009, Morgan Kaufmann, 4th Edition, Chapter 5: p. Nos. 450-567, 118 pages.

* cited by examiner

CACHE PRE-FETCHING USING CYCLIC BUFFER

CROSS-REFERENCE TO RELATED APPLICATION

This application claims priority to Greek Patent Application No. 20180100255, filed with the Greek Patent Office on Jun. 11, 2018, entitled "CACHE PRE-FETCHING USING CYCLIC BUFFER," the content of which is incorporated by reference herein in its entirety.

BACKGROUND

Access to main memory is associated with latency that arises from the time a processing unit needs in order to fetch that data into registers. Many computer systems utilize high-performance caches to increase reduce this latency and improve the performance of computer systems. However, due to various constraints, such as the financial cost of high-performance caches, it is not always feasible to store all data in high-performance caches. Instead, many computer systems utilize caches in conjunction with main memory, which is, relatively speaking, slower.

It is often challenging to fully utilize high-performance caches because they are relatively small in size (compared with main memory) and it is often difficult to determine which sets of data should be stored in a high-performance cache at a given point in time. Furthermore, it is difficult to anticipate which sets of data should be stored in a high-performance cache at a future point in time, which may be to account for the latency involved in loading data and instructions to the high-performance cache from memory.

BRIEF DESCRIPTION OF THE DRAWINGS

Various techniques will be described with reference to the drawings, in which.

DETAILED DESCRIPTION

Figure 1:
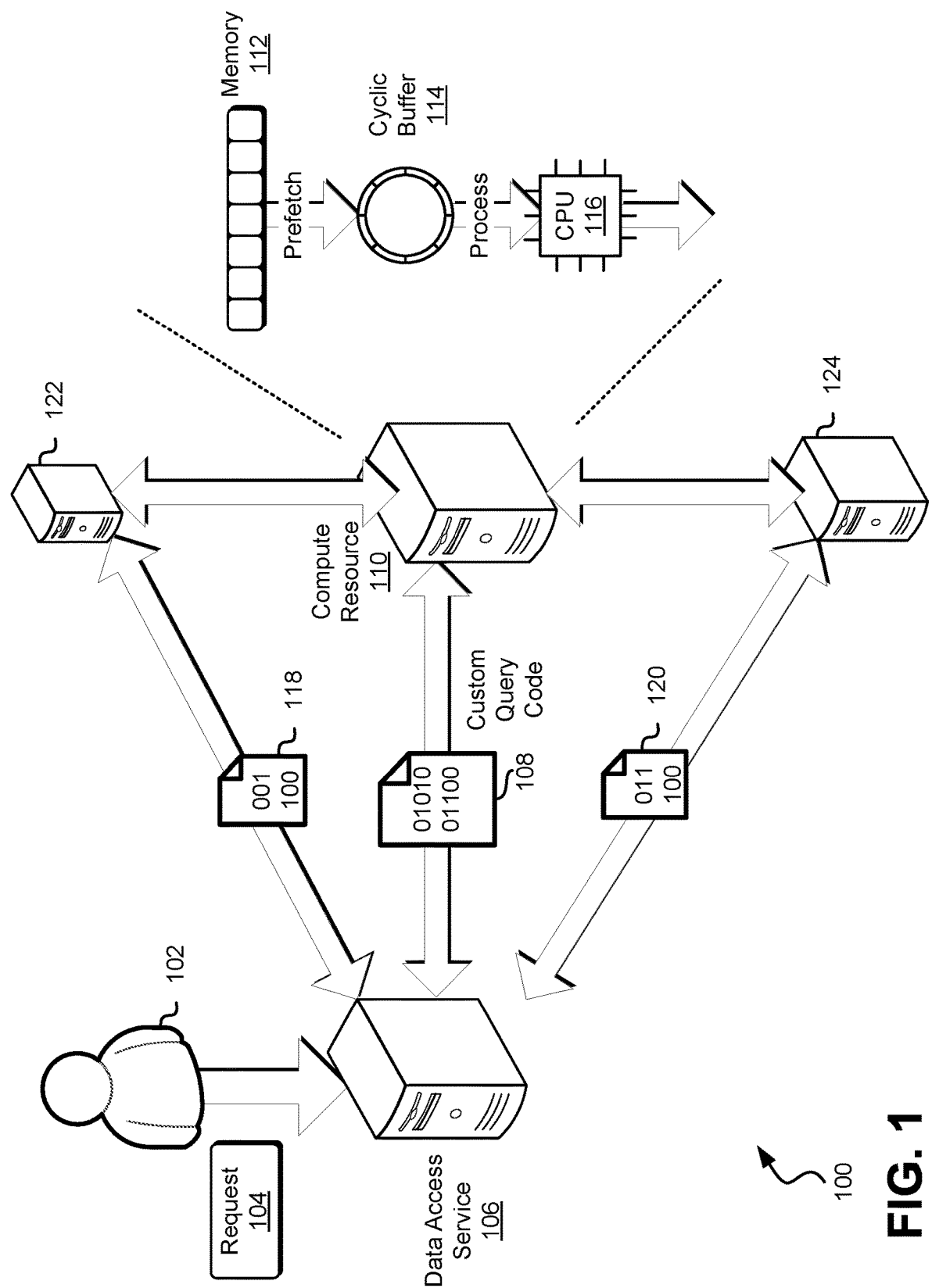
FIG. 1 illustrates a system in which one embodiment may be practiced.

Systems and methods described herein are, in an embodiment, implemented by a data management system to improve the performance of a computer system. In an embodiment, a computer system such as a data warehouse service performs pipelined tuple-at-a-time code generation and/or pre-fetching from memory which improve the operation of a computer system by decreasing memory stalls and keeping some or all data—represented as tuples—in the highest level of a hardware cache, thereby reducing data access latencies. In an embodiment, tuples are pre-fetched and stored in a cyclic buffer resident in an L1d hardware cache that is physically coupled to a central processing unit (e.g., integrated directly into the processor die). In an embodiment, the performance and efficiency of computer systems are improved using techniques described herein by reducing memory stalls during random memory probes, such as those used when accessing random buckets of a hash table, used during joins and aggregations.

In an embodiment, a compute instance comprises main memory, a hardware cache, and a central processing unit (CPU). In an embodiment, the compute allocates memory space in the hardware cache for a cyclic buffer that is used to store data. In an embodiment, the cyclic buffer is used to pre-fetch data entries that are accessed by the processor at a later point in time at which the chance of a memory stall arising from the data not being available is reduced or even eliminated.

Cache line pre-fetching, in an embodiment, is utilized to proactively pre-fetch cache lines based on future tuples, in accordance with an embodiment. In an embodiment, the technique is applied in scan? . . . ? hash join plans to pre-fetch the hash table bucket used in the hash join for a tuple before applying intermediate operations on future tuples. In an embodiment, the corresponding hash bucket for tuple i is pre-fetched while tuple i-k, which was pre-fetched at an earlier point in time, is being processed.

In an embodiment, main memory such as dynamic random access memory (DRAM) stores data elements i, i+1, . . . , i+w, i+w+1, . . . , i+j and pre-fetch commands may be used to access the data entries from main memory and store them in a processor cache. In an embodiment, the latency for access out of main memory is on the order of hundreds of CPU cycles whereas the latency for access of a processor cache is on the order of 2-3 CPU cycles. In an embodiment, main memory is much larger (e.g., on the order of gigabytes) than the processor cache which may have a capacity on the order of kilobytes. Examples of main memory include, but are not limited to: synchronous dynamic random-access memory (SDRAM); double data rate (DDR) RAM; Rambus DRAM (RDRAM); Synchronous-Link DRAM (SLDRAM); and Virtual Channel Memory (VCM) SDRAM.

In an embodiment, a cyclic buffer is a first-in-first-out (FIFO) data structure in which data is stored (pushed) to the end of the cyclic buffer and removed (popped) from the front. In an embodiment, the cyclic buffer is used to implement cache line pre-fetching to reduce latencies and improve performance. In an embodiment, a cyclic buffer (or a portion thereof) is populated by pre-fetching a set of tuples i, i+1 . . . , i+w. In an embodiment, when the system pre-fetches the hash table entry for tuple i+w, it stores the it in the cyclic buffer, and then, instead of pushing tuple i+w through the rest of the steps (e.g., to the processor, which may incur a memory stall), the system pops tuple i from the front of the cyclic buffer and continues processing the steps with tuple i. In an embodiment, the system replaces a first tuple with a second tuple (e.g., replaces tuple i with tuple i+w+1) by popping tuple i from the front of the cyclic buffer, thereby causing the front and back of the buffer to be updated so that the next tuple i+1 is at the front of the cyclic buffer and, after tuple i is popped from the front of the buffer, pre-fetching the hash table entry for tuple i+w+1 and pushing it to the back of the cyclic buffer (i.e., to the memory location of where tuple i was previously store). In an embodiment, techniques described herein may be utilized to improve the computational efficiency of computing systems in the performance of computational tasks such as query processing by reducing instruction footprint and memory stalls by maintaining data being processed in high-performance caches and/or reducing memory stalls during random memory access.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

In an embodiment, FIG. 1 illustrates a diagram of a system 100 in which an embodiment in accordance with this disclosure can be implemented. In an embodiment, the system 100 includes a user 102 that submits a request 104 to a data access service 106, custom query code 108 which may be sent to and received by a computing device 110 that comprises memory 112 and a processor (e.g., CPU 116). In an embodiment, the computational efficiency (i.e., performance) of a computer system (e.g., the computing device 110 illustrated in FIG. 1) is improved through the use of a cyclic buffer 114 to reduce memory stalls and reduce the latency associated with the execution of the custom query code 108.

In an embodiment, a Massively Parallel Processing (MPP) architecture is utilized, wherein the MPP architecture includes a leader node (e.g., the data access service 106) and one or more compute nodes (e.g., the compute resources 110). A MPP architecture may refer to the coordinated processing of a single task by multiple computing entities (e.g., compute instances), each computing entity having its own set of computing resources (e.g., operating system and memory) and communicating with each other using some form of messaging interface. MPP can be setup with a shared nothing or shared disk architecture. The data access service, in an embodiment, is configured to receive query requests, parse the queries, and develop a query execution plan. In an embodiment, the compute nodes generate intermediate results which are aggregated by the leader node. In an embodiment, multiple tiers of compute nodes are utilized for example, a first set of compute nodes (e.g., conceptually, leaf nodes of a tree), generate a first set of intermediate results which are aggregated by a second set of compute nodes (e.g., interior nodes of a tree) which in turn generate a second set of intermediate results, and so on, until a final set of intermediate results are aggregated by a leader node (e.g., the root node of a tree).

In an embodiment, the data access service 106 is a leader node of a MPP system and generates custom query code 108 based on a query request and configuration information of the system. In an embodiment, the data access service 106 coordinates the use of a plurality of compute instances to perform computational tasks that generate intermediate results which can be aggregated to determine a result that is provided as a response to the query request. In an embodiment, a query request to generate a sum of integer values across a set of database rows is uniformly distributed based on available compute resources—for example, if three compute instances having equal or approximately equal computational power are available, the data access service 106 may distribute a first custom query code to a first compute instance to generate the sum for a first set of the columns, a second custom query code to a second compute instance to generate the sum for a second set of the columns, and a third custom query code to a third compute instance to generate the sum of a third set of the columns to generate three intermediate sums that can be added together to generate a resulting sum value that reflects the sum of the columns. In an embodiment, the data access service 106 generates different custom query code for each compute resource of the plurality of compute resources, as shown in FIG. 1—a first compute resource 108 receives and executes a first custom query code 108, a second compute instance 122 receives and executes a second custom query code 118, and a third compute instance 124 receives and executes a third custom query code 120. It should be noted, however, that in an embodiment, the same custom query code (e.g., copies of executable code that include the same instructions) is distributed to some or all of the compute nodes, and different parameter (e.g., specifying the range of columns to process) are supplied to different compute nodes by the leader node to coordinate fulfillment of the query. The custom query code 108 may be source code, object code, or a combination thereof.

In an embodiment, a tuple refer to a set of named and types values. In an embodiment, a tuple may refer to a row of a database. In an embodiment, a tuple is immutable. In an embodiment, the data access service and the compute resources (collectively referred to as a data management system) utilize pipelined tuple-at-a-time code generation and/or pre-fetching from memory to improve the speed at which the data management system is able to satisfy query requests. In an embodiment, techniques described herein are used to lower instruction footprint and decrease memory stalls by keeping tuples that are being processed at the highest level of the cache (e.g., L1d cache) and/or decrease memory stalls during random memory probes such as those used when accessing random buckets of a hash table, used during joins and aggregations. Generally, higher level caches are faster than lower level caches. In an embodiment, a pipelined tuple-at-a-time engine maintains short instruction footprint and avoids expensive materialization of tuples to lower levels of the processor cache hierarchy or main memory. In an embodiment, a cyclic buffer 114 is utilized to reduce random memory data access stalls.

In an embodiment, the client 102 refers to a user of a database service. The client 102, in an embodiment, refers to a computing device that performs software operations on behalf of a client entity such as a human, organization, computer program, etc. In an embodiment, the client 102 (e.g., via a computing device) establishes a client-server relationship with a database service, such as the data access service 106 illustrated in FIG. 1, by completing a handshake process in which the client 102 authenticates with the service, the service authenticates with the client, or both (e.g., mutual authentication). The client 102 may include a client library that is used to submit application programming interface (API) requests to a service.

The request 104 illustrated in FIG. 1, in an embodiment, is a web API request submitted by the client 102 to a database service hosted on a computing resource service provider which is routed to a data access service 106 which is processed at least in part by the data access service 106. In an embodiment, the request is received by a front end of a computing resource service provider and a set of authentication and/or authorization operations are performed, and the request is routed to the data access service 106 as a result of successfully verifying the identity of the client and/or verifying that the client has sufficient security permissions associated with the request. In an embodiment, security permissions encode a set of permissions that encode actions the client is able to perform and computing resources that the client is allowed to access and are utilized to evaluate whether fulfillment of the client request 104 is authorized. In an embodiment, the request is an aggregation query.

In an embodiment, the data access service 106 is implemented as hardware (e.g., a physical server computer system in a data center), software (e.g., a virtual machine instance), or a combination thereof. In an embodiment, the data access service 106 is a data warehouse service that fulfills requests submitted to a computing resource service provider via a programmatic interface. In an embodiment, the data access service 106 is a data warehouse service. In an embodiment, a data warehouse service implements and/or supports several features, including but not limited to any combination of the following: column-store data storage and access; data compression; zone maps; direct-attached storage; large data block sizes; and more. Zone maps may refer to metadata that tracks the minimum and maximum values of block of data, which may be utilized to improve I/O performance by skipping over blocks that are not needed for a particular query. In an embodiment, the data access service 106 implements (e.g., as software) a query processor that is used to translate a query (e.g., received as part of the request 104) into custom query code 108 using a query compilation strategy. The custom query code, in an embodiment, includes executable code that can be executed to efficiently utilize caches, registers, and high-performance memory to efficiently generate query results. In an embodiment, the data access service 106 compiles the query into an executable format or uses an interpreter structure.

In an embodiment, a compute resource, such as one or more of the compute resources 110, 122, and 124, refers to a computing resource that is able to perform computations. In an embodiment, a compute resource 110 is implemented as hardware, software, or a combination thereof. A physical computing device (e.g., server computer system physically located in a data center) is, in an embodiment, used to implement one or more compute resources 110 wherein a compute resource utilizes one or more of the following components of the computing device: memory 112; a cyclic buffer 114; a central processing unit 116. In an embodiment, the compute resource 110 is a compute node of a distributed system that executes a routine to produce an intermediate result that is then provided to a leader node and/or other compute nodes and the intermediate result is aggregated with other intermediate results generated by other compute nodes to determine a result. In an embodiment, the compute resource 110 receives custom query code 108 and executes one or more instructions based on the custom query code. In an embodiment, the custom query code 108 is compiled by the compute resource 110 to generate machine-readable code that is executed by one or more processors of the compute resource. In an embodiment, the customer query code 108 is object code that includes a set of instructions that can be executed by one or more processors of the compute resource. The compute resource 110, in an embodiment, is implemented at least in part using a virtual machine (e.g., the compute resource 110 is a virtual machine instance running on a physical server).

In an embodiment, the compute resource 110 includes one or more hardware components such as: memory 112, a cyclic buffer 114; and a central processing unit 116.

In an embodiment, memory 112 refers to one or more types of volatile memory such as main memory (e.g., random-access memory), hardware caches, processor registers, and more. In an embodiment, the compute resource 110 has main memory and a multi-level cache wherein some or all of the aforementioned types of memory have different capacities and performance profiles. In an embodiment, each access to memory (e.g., main memory) is associated with some latency which is the time that the CPU 116 needs in order to fetch that data into registers. In an embodiment, caches (e.g., multi-level caches) are utilized to automatically store the last accessed data in order to be reaccessed much faster if it is needed again. In an embodiment, a cache miss refers to a failed attempt to read or write data to a cache, thereby resulting in access to a lower-level cache and/or main memory to fetch the requested data. In an embodiment, a cache miss can be an instruction read miss, a data read miss, and data write miss. In an embodiment, a cache miss causes a delay in the execution of a program because data or instructions must be fetched from a lower-level and/or main memory, and the execution of a processor may be stalled until the data/instructions are fetched. In an embodiment, a cache miss is undesirable because it reduces the performance of a computer system. Conversely, a cache hit, in an embodiment, refers to when an attempt to read or write data to a cache is successful because the memory address for the read or write is loaded in the cache. Further, unless stated otherwise or otherwise clear from context a "cache" as described herein refers to a hardware cache that is subject to possible cache misses that can stall the operation of a processor.

In an embodiment, a cyclic buffer 114 refers to a data structure that uses a single, fixed-size buffer as if it were connected end-to-end. In an embodiment, a cyclic buffer supports pushing (e.g., adding) elements to the end of the buffer and popping (e.g., removing) elements from the front of the buffer. In an embodiment, a cyclic buffer is used to implement a queue data structure. In an L1d cache is used to store the data contents of a cyclic buffer 114. In an embodiment, a tuple-at-time query execution is used while also being independent to query-specific properties of other steps such as scan selectivity. In an embodiment, the system processes a tuple i, pre-fetches the hash table entry, and stores it in a cache-resident cyclic buffer and then, instead of pushing tuple i through the rest of the steps, a tuple i-k that was pre-fetched at an earlier point in time, is popped from the buffer and the tuple i-k is processed.

In an embodiment, the central processing unit (CPU) 116 refers to a processor that is capable of executing instructions. The instructions, in an embodiment, are obtained from an L1i cache. In an embodiment the CPU 116 is communicatively coupled with the memory 112 and/or the cyclic buffer 114 (e.g., via a bus interface). In an embodiment, the CPU is physically coupled to a cache (e.g., an L1 cache integrated directly into the CPU die). It should be noted that while a CPU 116 is illustrated in FIG. 1, in accordance with an embodiment, any suitable processing unit, such as a graphical processing unit (GPU), is used in place of or in addition to the CPU 116.

As one skilled in the art will appreciate in light of this disclosure, certain embodiments may be capable of achieving certain advantages, including some or all of the following: improving the efficiency and/or speed of a computer system by utilizing higher-level hardware caches (e.g., L1 cache or processor registers) and maintaining short instruction foot prints that prevent and/or reduce the materialization of data to lower levels of the processor cache hierarchy (e.g., L3 cache) or main memory, reducing random memory data access stalls, and combinations thereof. As a result, a computer system in accordance with one embodiment is able to reduce the latency time that the CPU needs in order to fetch data into registers, thereby improving the operation of the computer system.

Figure 2:
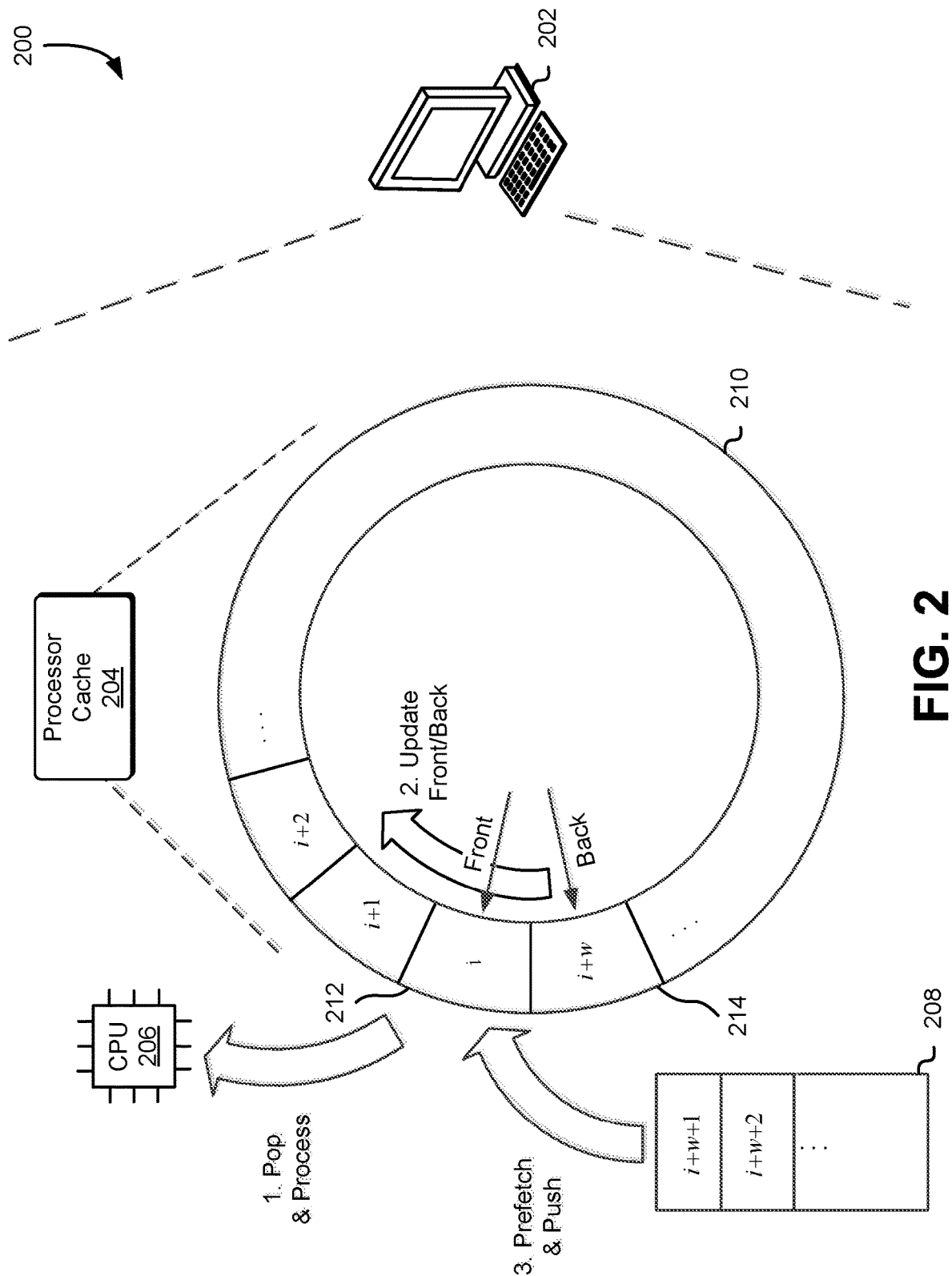
FIG. 2 illustrates a system capable of performing pre-fetching via cyclic buffering, according to at least one embodiment.

FIG. 2 illustrates a diagram of a system 200 in which an embodiment in accordance with this disclosure is implemented. In an embodiment, computing device 202 performs pre-fetching via cyclic buffering. The computing device 202, in an embodiment, comprises a processor cache 204, a central processing unit 206, and main memory 208. In an embodiment, a cyclic buffer 210 data structure is resident in the cache 204. The computing device 202 and portions thereof are, in an embodiment, utilized in accordance with systems described in accordance with FIG. 1.

In an embodiment, the processor cache 204 is a hardware cache that is capable of storing data and/or instructions. In an embodiment, the cache (or a portion thereof) is used to store a cyclic buffer 210. In an embodiment, the cache 204 is a processor cache such as a level-1 (L1) cache. In an embodiment, the cache 204 is an L1d cache used to store data rather than instructions. In an embodiment, a cache uses static random access memory (SRAM) which is a type of volatile memory that exhibits data remanence, but is still volatile in the conventional sense that data is eventually lost when it is not powered. SRAM should not be mistaken for synchronous dynamic random access memory (SD-RAM) which is a type of DRAM. In an embodiment, a hardware cache (e.g., processor cache 204) is configured to store multiple cyclic buffers that can be used independently or in conjunction with each other. In an embodiment, a first cyclic is used to pre-fetch a set of pointers to memory addresses containing data and processing the pointers involves pushing the pointers to a second cyclic buffer and processing the elements of the second cyclic buffer involves obtaining the data in the memory address referenced by the pointer. In an embodiment, a first cyclic buffer resident to a hardware cache is used to pre-fetch data for a first request and a second cyclic buffer also resident to the same hardware cache is used to pre-fetch data for a second request unrelated to the first request.

The central processing unit 206 is a process that is capable of executing instructions. In an embodiment, data and instructions processed by the CPU 206 are obtained from a processor cache such as an L1 cache. The instructions may, in an embodiment, be instructions according to a particular instruction set such as an x86 instruction set, Advanced RISC Machine (ARM) instructions set, and more. The instruction set, in an embodiment, is based on the instruction set supported by the CPU 206. In an embodiment, the CPU 206 uses the processor cache 204 to reduce latencies—the latency of an L1 cache access may be 2-3 CPU cycles, whereas the latency for access out of main memory may be on the order of hundreds of cycles.

In an embodiment, latency of waiting for cache lines out of the cache is reduced by using pre-fetching to inform the CPU to load a specific memory location but not to wait (i.e., stall) until it has arrived to use it. In an embodiment, a cyclic buffer 210 is used to pre-fetch data. In an embodiment, the system reserves space in the processor cache 204 for a cyclic buffer of a predetermined size, wherein the size may be based on the pre-fetch latencies from main memory compared with the data access times for the CPU to access the processor cache 204. For example, if the L1 cache access time is 4 CPU cycles and the pre-fetch latency time is 200 CPU cycles, the system may reserve a pre-fetch window size of 200/4=50 entries for the cyclic buffer. In an embodiment, the pre-fetch window size is an integer power of 2. It should be noted that the size of a data structure such as a cyclic buffer may refer to the actual number of entries in a data structure such as a cyclic buffer) whereas capacity may refer to the maximum number of entries that the data structure can accommodate based on the amount of memory allocated for the data structure.

In an embodiment, cache line pre-fetching is utilized to proactively pre-fetch cache lines based on future tuples. In an embodiment, the technique is applied in scan? . . . ? hash join plans to pre-fetch the hash table bucket used in the hash join for a tuple before applying intermediate operations on the future tuples. In an embodiment, while tuple i is being processed, the corresponding hash bucket for tuple i+k is pre-fetched. In an embodiment, this technique does not require buffering but needs to look-ahead to a future tuple i+k which applies to scanning base or materialized intermediate tables. In an embodiment, some or all of the tuples may be filtered if there is a selection with few qualifying tuples, and in such cases, issuing a pre-fetch for every tuple proactively can reduce the effective memory bandwidth by issuing too many redundant memory accesses.

In an embodiment, main memory 208 refers to volatile memory that allows data to be read and written to. In an embodiment, main memory refers to an integrated circuit module that can be physically coupled and decoupled (e.g., attached or detached from a motherboard). In an embodiment, main memory refers to dynamic random access memory (DRAM). Main memory, in an embodiment, refers to a DRAM module that is physically attached (e.g., via physical latches or levers) to a motherboard that includes one or more processors which may also be physically attached to the motherboard.

In an embodiment, main memory 208 stores data elements i, i+1, . . . , i+w, i+w+1, . . . , i+j and pre-fetch commands may be used to access the data entries from main memory 208 and store them in the processor cache 204. In an embodiment, the latency for access out of main memory 208 is on the order of hundreds of CPU cycles whereas the latency for access of a processor cache 204 is on the order of 2-3 CPU cycles. In an embodiment, main memory is much larger (e.g., on the order of gigabytes) than the processor cache 204 which may have a capacity on the order of kilobytes.

In an embodiment, the cyclic buffer 210 is a first-in-first-out (FIFO) data structure in which data is stored (pushed) to the end 214 of the cyclic buffer and removed (popped) from the front 212. In an embodiment, the cyclic buffer 210 is used to implement cache line pre-fetching to reduce latencies and improve performance. In an embodiment, a cyclic buffer 210 (or a portion thereof) is populated by pre-fetching a set of tuples i, i+1 . . . , i+w. In an embodiment, when the system pre-fetches the hash table entry for tuple i+w, it stores the it in the cyclic buffer, and then, instead of pushing tuple i+w through the rest of the steps (e.g., to the processor, which may incur a memory stall), the system pops tuple i from the front of the cyclic buffer and continues processing the steps with tuple i. In an embodiment, if there are multiple steps that can use pre-fetching in the same segment, the system uses the same technique independently on each step. In an embodiment, the system replaces a first tuple with a second tuple (e.g., replaces tuple i with tuple i+w+1) by popping tuple i from the front of the cyclic buffer 210, thereby causing the front and back of the buffer to be updated so that the next tuple i+1 is at the front of the cyclic buffer and, after tuple i is popped from the front of the buffer, pre-fetching the hash table entry for tuple i+w+1 and pushing it to the back of the cyclic buffer (i.e., to the memory location of where tuple i was previously store).

In an embodiment, the following is simplified code that illustrates aspects of pre-fetching as shown below. In an embodiment, the pre-fetching window size is predetermined and is a power of 2, and operations such as modulus operations are fast (e.g., performed using bitwise-AND operation):

```
/* scan code */
for (i = 0; i < R_tuples; ++i) {
R_key = R_key_column[i]; /* load columns */
R_val = R_val_column[i];
R_sel = R_sel_column[i];
if (R_val <= X) continue; /* apply selection */
/* hash join code */
h = hash(R_key);
prefetch(&R_hash_table[h]); /* prefetch the 1st hop */
if (i < W) { [...] } /* special case if the buffer is not yet full */
q = &PF_buffer[i % W]; /* buffer slot for current tuple */
q->R_key = R_key; /* store the current tuple in the buffer */
q->R_val = R_val;
q->ptr = &R_hash_table[h]; /* store the pointer to the hash table */
q = &PF_buffer[(i + W / 2) % W]; /* buffer slot for W/2 tuples ago */
p = *(q->ptr); /* use the prefetched pointer to the hash table */
prefetch(p); /* prefetch the 2nd hop */
q->ptr = p; /* store the pointer to the tuple */
q = &PF_buffer[(i + W - 1) % W]; /* buffer slot for W-1 tuples ago */
for (p = q->ptr; p; p = p->next) {
if (q->R_key != p->S_key) continue; /* use the prefetched pointer */
/* aggregation code */
sum += q->R_val;
}
} /* process the tuples remaining in the prefetching buffer */
```

Figure 3:
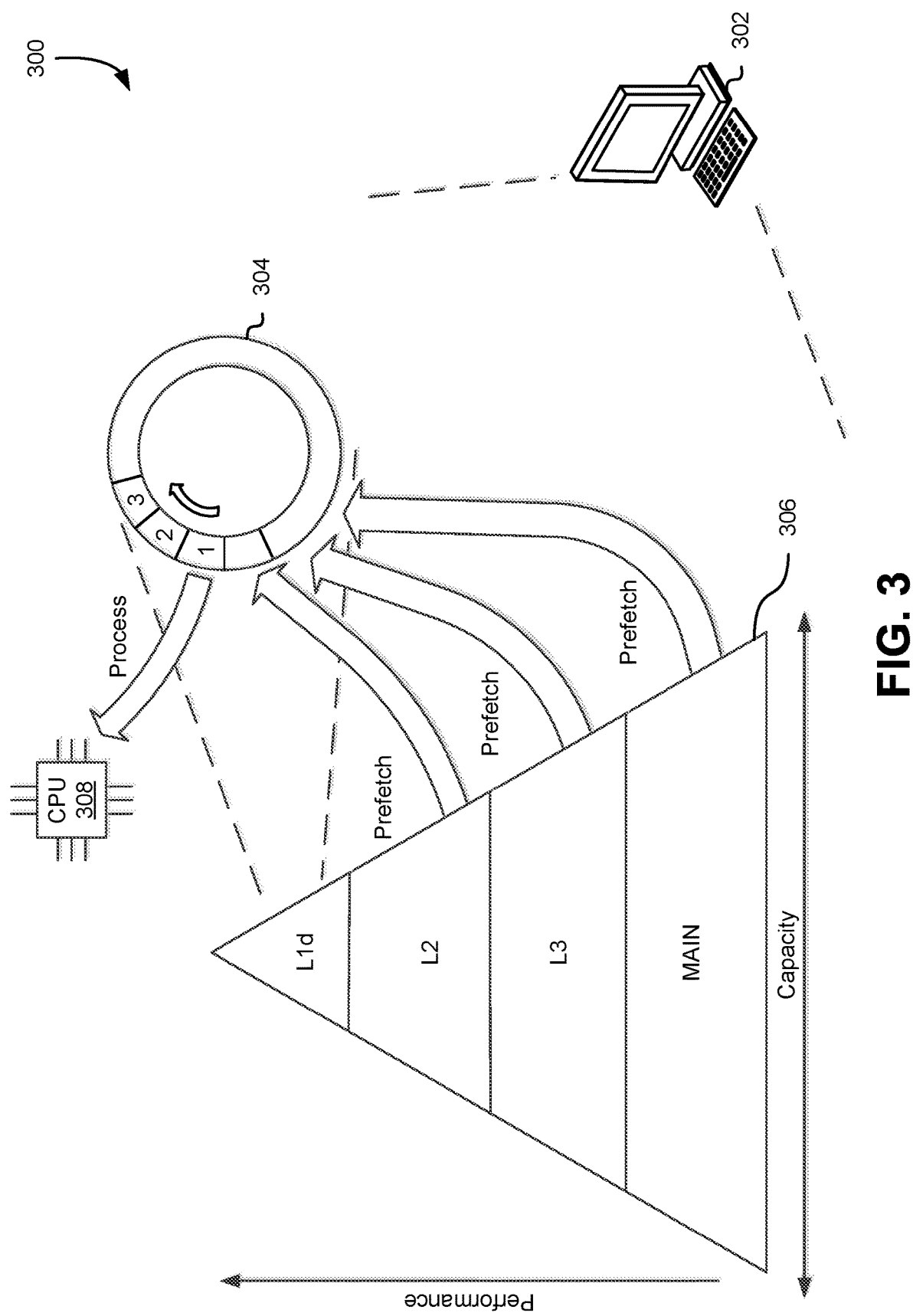
FIG. 3 illustrates a diagram of a system that utilizes a multi-level cache hierarchy, in accordance with an embodiment.

FIG. 3 illustrates a diagram of a system 300 in which an embodiment in accordance with this disclosure is implemented. In an embodiment, computing device 302 performs pre-fetching via cyclic buffering. The computing device 302, in an embodiment, comprises a cyclic buffer 304, memory organized in a multi-level memory hierarchy 306, and a central processing unit 308. The computing device 302 and portions thereof are, in an embodiment, utilized in accordance with systems described in accordance with FIG. 1.

In an embodiment, memory refers to one or more types of volatile memory such as main memory (e.g., random-access memory), hardware caches, and more. In an embodiment, the computing device utilizes main memory, a multi-level cache, and registers to store instructions and data. The storage of instructions and data, in an embodiment, using the memory structures described herein may be for short durations of time, which may be measured in CPU cycles and can be on the order of nanoseconds or microseconds. In an embodiment, the memory hierarchy 306 illustrated in FIG. 3 is used to illustrate how some or all of the aforementioned types of memory have different capacities and performance profiles. In an embodiment, a system has a multi-level cache that includes L1 (level-1) cache, an L2 (level-2) cache, and an L3 (level-3) cache. In an embodiment, an L1 cache is split into an L1d cache for data and an L1i cache for instructions. In an embodiment, the cyclic buffer 304 resides exclusively in L1d cache. In an embodiment, cache memory is physically and/or logically (e.g., architecturally) closer to the CPU and reads and/or writes to data loaded in a cache are, on average, faster than reads and/or writes to data that is loaded in main memory. In an embodiment, a cache comprises a plurality of cache row entries wherein each cache row entries includes a data block that represents the actual data (e.g., fetched from a lower-level cache or main memory) and a tag that includes at least part of the memory address of where the actual data was fetched from. In an embodiment, a row entry also includes a set of flags (e.g., a valid bit and a dirty bit), error correction code (ECC) bits, and more. The valid bit may, in an embodiment, is used to determine whether a cache block has been loaded with valid data and the dirty bit is used to determine whether the associated cache line has been changed since it was read from main memory (e.g., the processor has written data to the cache line and the new value has not yet propagated to main memory).

In an embodiment, each access to memory (e.g., main memory) is associated with some latency which is the time that the CPU 308 needs in order to fetch that data into registers. In an embodiment, caches (e.g., multi-level caches) are utilized to automatically store the last accessed data in order to be reaccessed much faster if it is needed again. In an embodiment, a cache miss refers to a failed attempt to read or write data to a cache, thereby resulting in access to a lower-level cache and/or main memory to fetch the requested data. In an embodiment, a cache miss can be an instruction read miss, a data read miss, and data write miss. In an embodiment, a cache miss causes a delay in the execution of a program because data or instructions must be fetched from a lower-level and/or main memory, and the execution of a processor may be stalled until the data/instructions are fetched. In an embodiment, a cache miss is undesirable because it reduces the performance of a computer system. Conversely, a cache hit, in an embodiment, refers to when an attempt to read or write data to a cache is successful because the memory address for the read or write is loaded in the cache. Further, unless stated otherwise or otherwise clear from context a "cache" as described herein refers to a hardware cache that is subject to possible cache misses that can stall the operation of a processor.

In an embodiment, a cyclic buffer 304 is initialized in an empty state and tuple entries may be pre-fetched in sequence, and after the cyclic buffer is filled, the first tuple is processed by the CPU 308. In an embodiment, the size of the cyclic buffer 304 is configured to have a capacity of w so that the time to pre-fetch w tuples is approximately equal to (or otherwise based on) the time it takes for data to be pre-fetched from main memory or a lower-level cache. In an embodiment, the approximation can be made based on various criteria, such as the expected latency of data access from main memory and the expected cache miss rate based on empirical and/or statistical data. In an embodiment, the processor may attempt to access a tuple based on when the data is expected to be available—for example, if the cyclic buffer has a window size of 64 entries, the L1d cache has a latency of 3 cycles, and the latency for access of data out of main memory is 150 cycles, the processor may process the first tuple after pre-fetching the 150/3=50th tuple to the cyclic buffer even though the cyclic buffer is not yet filled to capacity. The number of tuples after which the system access a previous tuple is, in an embodiment, determined dynamically or statically.

References to caches throughout this disclosure may, based on the context, refer to hardware caches which refer to hardware components (e.g., memory units) that store data so that further requests for the data can be serviced faster. Generally speaking, a hardware cache is faster, but smaller in capacity than main memory due to the higher costs (cost referring to the cost-per-byte) of faster caches compared to slower types of memory units. Caches, as described in this disclosure, may have properties wherein a cache hit occurs when data that is requested can be found in the cache and a cache miss occurs when the data is not found in the cache. A cache miss may refer to a failed attempt to read or write a piece of data to the cache, which may result the execution of a processor being stalled, freezing the contents of all registers until the data is loaded to the cache (e.g., from a lower-level cache or main memory). The cache miss handling may be done with the processor control unit and with a separate controller that imitates memory access to repopulate the cache. As described herein, hardware caches may refer to processor registers, processor caches, L1 caches, main memory (e.g., RAM), and any other suitable memory unit implemented at least in part using computer hardware. In an embodiment, non-volatile storage media are used to implement hardware caches. In an embodiment, a sold-state drive (SSD) is used to implement a hardware cache that improves read and/or write access to a sequential access tape drive.

Figure 4:
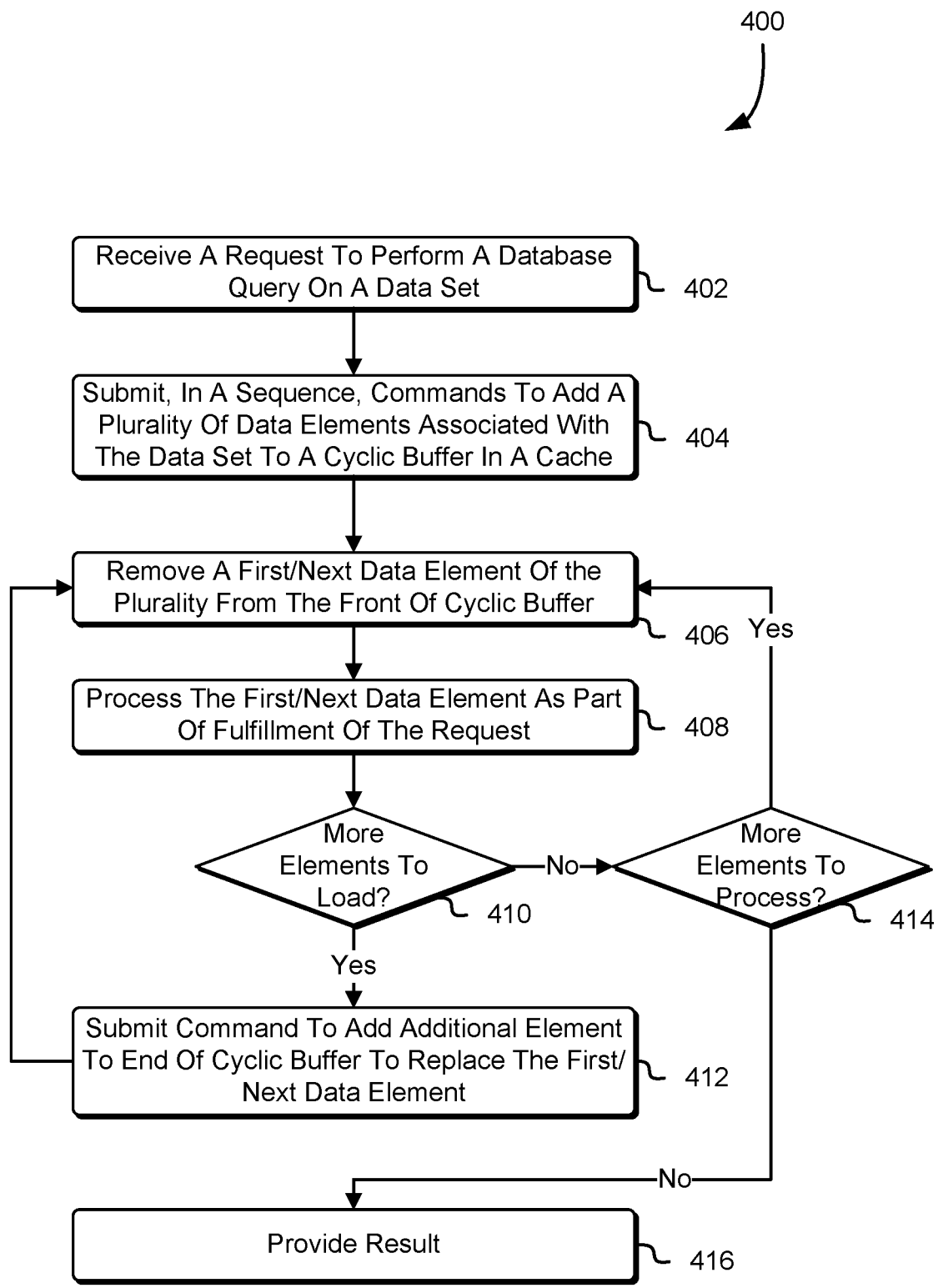
FIG. 4 illustrates a process for pipelined tuple-at-a-time code generation and/or pre-fetching from memory to improve the speed at which the data management system is able to satisfy query requests in accordance with an embodiment.

FIG. 4 shows an illustrative example of a process 400 for pipelined tuple-at-a-time code generation and/or pre-fetching from memory to improve the speed at which the data management system is able to satisfy query requests in accordance with an embodiment. Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, software, or combinations thereof. The code may be stored on a computer-readable storage medium, for example, in the form of a computer program comprising a plurality of instructions executable by one or more processors. The computer-readable storage medium may be a non-transitory computer-readable medium. In some embodiments, at least some of the instructions usable to perform the process 400 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals. In an embodiment, the process 400 is performed by any suitable system, such as a compute resource in accordance with those described in connection with FIG. 1.

In an embodiment, the system performing the process 400 is a database warehouse service comprising one or more leader nodes that coordinate the use of a plurality of compute nodes. In an embodiment, the system performing the process 400 is a particular compute node or a set of compute nodes of a Massively Parallel Processing (MPP) system. In an embodiment, the system receives 402 a request to perform a database query on a dataset, the dataset may include structured data from a column-store database such as a query that involves joins and/or aggregations. In an embodiment, the system generates, in response to the request, custom query code that is usable to fulfill the request. In an embodiment, the system implements (e.g., as software) a query processor that is used to translate a query (e.g., received as part of the request) into custom query code using a query compilation strategy. The custom query code may be source code (e.g., C++ source code) that can be compiled or interpreted. The custom query code may be provided to a compute node of a MPP architecture to cause the compute node to perform one or more of the following steps:

In an embodiment, the system (e.g., a compute node of the system) submits 404, in a sequence, commands to add a plurality of data elements associated with the data set to a cyclic buffer in a cache. In an embodiment, data elements of the data set are represented as $\{i, i+1, \ldots, i+j-1, i+j\}$. In an embodiment, the cache is a hardware cache. In an embodiment, the cache is an L1d cached used to store data (as opposed to an L1i cache used to store instructions). In an embodiment, the commands are pre-fetch commands to load a specific memory location but not to wait until the data has arrived to use it. In an embodiment, a pre-fetch command is a command to load the contents of a memory location from a lower-level cache to a higher-level cache (e.g., from L2 cache to L1 cache or from main memory to L1 cache). In an embodiment, a first-in-first-out (FIFO) queue is used in place of a cyclic buffer.

In an embodiment, the number of pre-fetch commands that the system submits is sufficient to populate the entire capacity of the cyclic buffer, which may have a predetermined amount of memory reserve for its use. In an embodiment, the window size of the cyclic buffer is determined based on an estimated latency of data access from the cache and from main memory. In an embodiment, the window size of the cyclic buffer is calculated so that the estimated amount of time it takes to issue w pre-fetch commands is greater than or equal to the estimated amount of time it takes to load a data element (e.g., tuple) from main memory. In an embodiment, the window size is based on the estimated amount of time it takes to load a data element, which accounts for the probability that the data element is loaded in a cache (e.g., L2 cache). In an embodiment, the window size (or capacity) of the cyclic buffer is predetermined and/or is a power of two.

In an embodiment, after the system submits w pre-fetch commands, w being the capacity of the cyclic buffer, and then removes 406 the first data element (e.g., tuple i) of the plurality from the front of the cyclic buffer. In an embodiment, the first data element is popped from the top of the cyclic buffer and made available to a processor such as a CPU. In an embodiment, the cyclic buffer is resident in a cache (e.g., L1d cache) that is physically coupled to the processor (e.g., the cache is integrated directly into the CPU die). In an embodiment, the CPU processes 408 the first data element as part of fulfilling the request, which may include executing custom query code to generate an intermediate result, performing aggregation, and more. In an embodiment, a memory stall is not encountered as a result of accessing the first data element, at least because sufficient time has elapsed between the issuing of the command to pre-fetch the first data element and the accessing of the first data element. In an embodiment, a CPU executes the custom query code according to an instruction set such as x86 instruction set or ARM instruction set.

In an embodiment, as part of removing the first data element from the front of the cyclic buffer, state information of the cyclic buffer is updated. For example, for a cyclic buffer that is filled to capacity with tuples i, i+1, . . . , i+w, popping the first data element (tuple i) results in the front of the cyclic buffer pointing to the i+1.

In an embodiment, the system determines whether 410 more elements of the data set are to be processed. In an embodiment, the number of data element in the data set is greater than the size of the cyclic buffer (e.g., because the cache is too small to store the entire data set) and the system submits a command to add an additional data element to the end of the cyclic buffer 412. The command, in an embodiment, is a pre-fetch command to load a specific memory location but not to wait until the data has arrived to use it. Referring to the previous example above, the system pushes tuple i+w+1 to the memory location where tuple i was previously stored, which is the back of the cyclic buffer. As illustrated in FIG. 4, these steps may be repeated until all data element in the data set are loaded in the cyclic buffer, such as in the following manner: the i+1-th data element of the plurality is removed (e.g., popped) from the front of the cyclic buffer and processed as part of fulfillment of the request (e.g., in connection with the simplified code above, aggregation code is executed to add the value of the i+1-th data element to a running sum) and then the i+w+2-th data element is pre-fetched to the back of the cyclic buffer, contingent upon i+w+j<i+j being satisfied.

In an embodiment, the system determines that there are no more data elements in the set of data elements and determines whether 414 there are more data elements to process. In an embodiment, pre-fetch commands have been issued to the entire set of data elements i, . . . i+j and after the i+j−w-th data element is processed, there are no more data elements to pre-fetch. In an embodiment, after all data elements have been processed, the system provides 416 a result. In an embodiment, the result is an intermediate result that is provided to a leader node and a request response is generated based on aggregating the intermediate result with other intermediate results.

A cyclic buffer as described herein may also be referred to as a circular buffer, a circular queue, a ring buffer, or any other type of data structure that uses a single, fixed-size buffer as if it were connected end-to-end. In an embodiment, a cyclic buffer is implemented using any suitable data structure including, but not limited to a linked list (e.g., a circular linked list). In an embodiment, a cyclic buffer is used to implement a first-in-first-out (FIFO) queue that supports commands for enqueuing (or pushing) to a back of the data structure and dequeuing (or popping) from the front of the data structure in a FIFO manner.

Figure 5:
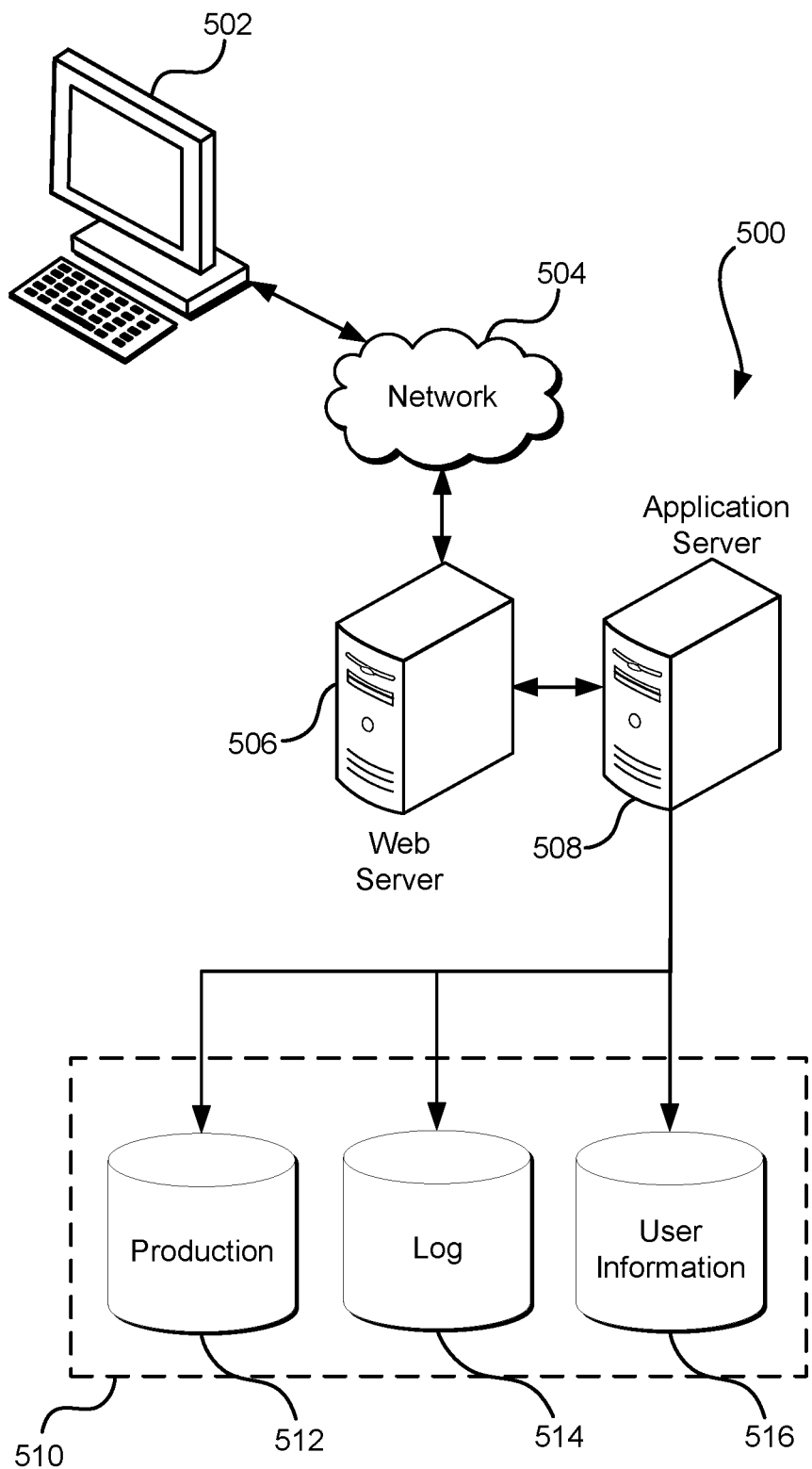
FIG. 5 illustrates a system in which various embodiments can be implemented.

FIG. 5 illustrates aspects of an example system 500 for implementing aspects in accordance with an embodiment. As will be appreciated, although a web-based system is used for purposes of explanation, different systems may be used, as appropriate, to implement various embodiments. In an embodiment, the system includes an electronic client device 502, which includes any appropriate device operable to send and/or receive requests, messages, or information over an appropriate network 504 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 506 for receiving requests and serving content in response thereto, although for other networks an alternative device serving a similar purpose could be used as would be apparent to one of ordinary skill in the art.

In an embodiment, the illustrative system includes at least one application server 508 and a data store 510 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 502 and the application server 508, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 510, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 512 and user information 516, which are used to serve content for the production side. The data store also is shown to include a mechanism for storing log data 514, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 510.

The data store 510, in an embodiment, is operable, through logic associated therewith, to receive instructions from the application server 508 and obtain, update or otherwise process data in response thereto and the application server 508 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 502. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 500 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 500, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 5. Thus, the depiction of the system 500 in FIG. 5 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   generating code in response to a request to perform a query, wherein the code comprises instructions to:
   submit, in a sequence, a plurality of commands to add a plurality of data elements associated with a data set to a cyclic buffer in a hardware cache;
   in response to detecting that the buffer is full, remove a first data element of the plurality from the cyclic buffer;
   process the first data element as part of fulfillment of the request; and
   as a result of the first data element having been removed from the cyclic buffer, submit a different command of the plurality of commands to add an additional data element of the data set to the cyclic buffer to replace the first data element; and
   causing execution of the query according to the code.

2. The computer-implemented method of claim 1, wherein the hardware cache is a first hardware cache and the plurality commands to load the plurality of elements are commands to load at least part of the plurality of elements from a second hardware cache, wherein the second hardware cache is lower than the first hardware cache in a cache hierarchy.

3. The computer-implemented method of claim 1, wherein:
   the cyclic buffer is a first-in-first-out (FIFO) data structure;
   the instructions to add the plurality of data elements to the cyclic buffer are instructions to push the plurality of data elements to a back of the cyclic buffer according to the sequence; and
   the instructions to remove the first data element from the cyclic buffer are instructions to pop the plurality of data elements from a front of the cyclic buffer.

4. The computer-implemented method of claim 1, further comprising:
   in response to detecting that the cyclic buffer is full, identifying, based on the sequence, a second element of the data set;
   processing the second element of the data set according to the request; and
   in response to processing the second element of the data set, submitting a second command to replace the second element from the buffer with a second additional element of the data set.

5. A system, comprising main memory to store computer-executable instructions that, as a result of execution by one or more processors, cause the system to:
   obtain a request to process a set of data elements;
   load a first subset of the set of data elements into a first cache;
   load a second subset of the set of data elements into a second cache; and
   as a result of elements of the first subset of the set of data elements being processed, issue commands to place elements of the second subset of the set of data elements into the first cache to enable processing the second subset of the set of data elements to be processed from the first cache.

6. The system of claim 5, wherein the instructions to load the first subset into the first cache include instructions that cause the system to submit commands to load first subset to a cyclic buffer resident to the first cache.

7. The system of claim 6, wherein a buffer size is allocated based at least in part on an expected latency of the second cache.

8. The system of claim 5, wherein the commands to place the elements of the second subset into the first cache include instructions to store a pointer to a hash table, wherein dereferencing the pointer is usable to access the elements of the second subset.

9. The system of claim 5, wherein the commands to place the elements of the second subset into the first cache are pre-fetch commands.

10. The system of claim 5, wherein the instructions include instructions that, as a result of execution by the one or more processors, cause the system to process data elements loaded in the first cache in an order that the data elements were caused to be loaded into the first cache.

11. The system of claim 5, wherein the main memory is the second cache and the system comprises a L2 hardware cache that is different from the main memory.

12. The system of claim 5, wherein the first cache is an L1d hardware cache.

13. A non-transitory computer-readable storage medium having stored thereon executable instructions that, if executed by one or more processors of a computer system, cause the computer system to at least:
submit commands to load a plurality of elements of a data set to a buffer;
detect, as a result of a first command of the plurality of commands being fulfilled, that a first element of the plurality of elements was loaded into the buffer;
process the first element of the plurality of elements based on an order in which the first command to was submitted relative to other commands of the plurality of commands to load other elements; and
in response to detecting that the first element of the plurality of elements was processed, submit a second command to load, to the buffer, another element of the data set.

14. The non-transitory computer-readable storage medium of claim 13, wherein the buffer is a first-in-first-out (FIFO) queue.

15. The non-transitory computer-readable storage medium of claim 13, wherein the second command to load the other element of the data set include instructions that, if executed by the one or more processors, cause the computer system to store a pointer to a hash table, wherein dereferencing the pointer is usable to access the another element of the data set.

16. The non-transitory computer-readable storage medium of claim 13, wherein:
the buffer resides in a first cache; and
the commands to add the plurality of data elements are pre-fetch instructions to add the plurality of data elements to the buffer from a second cache, wherein the second cache is lower than the first cache in a cache hierarchy.

17. The non-transitory computer-readable storage medium of claim 16, wherein the instructions further comprise instructions that, if executed by the one or more processors, cause the computer system to select a size of the buffer based on an estimation of latency involved in pre-fetching data elements from the second cache.

18. The non-transitory computer-readable storage medium of claim 16, wherein first cache is an L1 cache and the second cache is an L2 cache.

19. The non-transitory computer-readable storage medium of claim 13, wherein the buffer resides in processor registers physically coupled to at least one of the one or more processors.

20. The non-transitory computer-readable storage medium of claim 13, wherein size of the data set is larger than size of the buffer.

\* \* \* \* \*